United States Patent
Zaitsev

(10) Patent No.: US 11,042,507 B2
(45) Date of Patent: Jun. 22, 2021

(54) SYSTEM AND METHOD OF DELETION OF FILES AND COUNTERACTING THEIR RESTORATION

(71) Applicant: AO Kaspersky Lab, Moscow (RU)

(72) Inventor: Oleg V. Zaitsev, Moscow (RU)

(73) Assignee: AO Kaspersky Lab, Moscow (RU)

(*) Notice: Subject to any disclaimer, the term of this patent is extended or adjusted under 35 U.S.C. 154(b) by 197 days.

(21) Appl. No.: 16/363,334

(22) Filed: Mar. 25, 2019

(65) Prior Publication Data

US 2020/0210382 A1 Jul. 2, 2020

(30) Foreign Application Priority Data

Dec. 28, 2018 (RU) .......................... RU2018147241

(51) Int. Cl.
| | | |
|---|---|---|
| *G06F 17/00* | (2019.01) | |
| *G06F 16/16* | (2019.01) | |
| *G06F 16/14* | (2019.01) | |
| *G06F 16/17* | (2019.01) | |

(52) U.S. Cl.
CPC .......... *G06F 16/162* (2019.01); *G06F 16/148* (2019.01); *G06F 16/1727* (2019.01)

(58) Field of Classification Search
CPC .. G06F 16/162; G06F 16/148; G06F 16/1727; G06F 21/60; G11B 5/024
See application file for complete search history.

(56) References Cited

U.S. PATENT DOCUMENTS

| | | | |
|---|---|---|---|
| 7,275,139 B1 | 9/2007 | Tormasov et al. | |
| 9,747,057 B1* | 8/2017 | Ramani | G06F 3/067 |
| 2005/0065961 A1* | 3/2005 | Aguren | G06F 16/10 |
| 2005/0256838 A1* | 11/2005 | Lasser | G06F 3/0643 |
| 2006/0288044 A1* | 12/2006 | Kashiwagi | G11B 27/329 |
| 2007/0104007 A1* | 5/2007 | Mizuno | H04N 1/448 |
| | | | 365/221 |
| 2008/0222207 A1* | 9/2008 | Ito | G06F 3/0623 |
| 2010/0138619 A1 | 6/2010 | Benavides | |
| 2010/0211541 A1 | 8/2010 | Deetz et al. | |
| 2011/0289271 A1 | 11/2011 | Nagpal et al. | |
| 2013/0061011 A1* | 3/2013 | Woo | G06F 21/79 |
| | | | 711/155 |
| 2018/0024892 A1* | 1/2018 | Mutha | G06F 11/1453 |
| | | | 707/692 |

FOREIGN PATENT DOCUMENTS

RU 96433 U1 7/2010

* cited by examiner

*Primary Examiner* — Syed H Hassan

(74) *Attorney, Agent, or Firm* — Arent Fox LLP; Michael Fainberg

(57) ABSTRACT

Disclosed herein are systems and methods for deleting files. In one aspect, an exemplary method comprises, obtaining at least initial data about a file to be deleted in accordance with an instruction to remove the file from a data storage device, analyzing the file to be deleted and the data storage device to determine at least deletion parameters of the file to be deleted, performing a dynamic formation of a deletion algorithm, wherein the formation further includes the formation of a structure for writing and a determination of a location for the writing during the deletion of the file in accordance with the determined deletion parameters and rules of formation, and deleting the file by applying the deletion algorithm.

17 Claims, 5 Drawing Sheets

SYSTEM AND METHOD OF DELETION OF FILES AND COUNTERACTING THEIR RESTORATION

CROSS REFERENCE TO RELATED APPLICATIONS

The present application claims priority to Russian Patent Application No. 2018147241, filed on Dec. 28, 2018, the entire content of which is incorporated herein by reference.

FIELD OF TECHNOLOGY

The present disclosure relates to the field of computer security, more specifically to systems and methods for permanent removal of files.

BACKGROUND

The information used on the computing device (computer) of a user is usually kept on a rewritable data storage device. Such a data storage device is generally a hard disk drive (HDD) or a solid-state disk (SSD). Such devices are the standard data storage drives in practically all computers. It should also be noted that mobile rewritable data storage devices, e.g., USB flash drives and various kinds of memory cards, are also commonly used.

With the exception of reading and writing of information on a data storage device, the deletion of information is the next important problem users need to address. For example, when a data storage device is sold or handed over to someone, files which have been previously deleted by an ordinary method can be restored; in this way, the user may involuntarily provide personal data which is still accessible after the deletion of the files. The restoration of the files is possible because, in the ordinary method of deletion of the files, the data corresponding to the files to be deleted is not deleted from the data storage device, but rather the files are only marked as deleted in the file system. Accordingly, after an ordinary deletion, the file data is still present on the data storage device, and during the further use of the data storage device such file data may be overwritten by data of another type. The ordinary method of deletion makes speeds up the work of the file system when deleting files. The full deletion of files takes a very long time, and the longer this time, the longer the data storage device cannot be used. For example, the deletion of a file containing a video film of 50 GB will take an appreciable time, even on such data storage devices as SSD drives. Furthermore, a rapid deletion extends the resource (lifetime) of the data storage devices. Therefore, there is a need to delete a file in such a way that the deleted file cannot be restored, even by specialized utilities.

One approach to delete files is using special restoration utilities. The special restoration utilities can restore information on data storage devices in various ways. For example, the restoration utilities may read the data storage device sector by sector, perform an analysis of the various logic structures of the data storage device, and then find and extract the deleted files. In the event that all meta-data describing the files is lost, utilities exist which analyze the supposed content of the files being read from the data storage device. Many files (images, documents, etc.) have characteristic headers that make restoration of the files possible, even in complete absence of information about the location and the size of the files. To be sure, the possibility of restoring accidentally deleted files is an extremely important function. At the same time, such a possibility of restoring deleted files and obtaining the information contained in the deleted files may also be utilized by hackers. This problem may be especially acute for commercial companies which may have an enormous quantity of information which is a business secret. One example of such information is financial accounts, passwords, personal user data, and others.

Another approach to reliably delete a file, be certain that it cannot be restored, and access cannot be obtained to the information contained in the file, is to employ a method which is realized in some software products known as shredders. Such programs have approximately the same operation.

One example of a system of irretrievable file deletion using a shredder is described in Russian Utility Model Patent No. 96433 [A1] of AO Kaspersky Laboratory. The principle of operation of the described shredder consists, in the shredder, performing a file deletion by following a "formula"—a text string in which the operations to be executed in the file deletion process are encoded. The elements of the "formula" make it possible to prescribe a mashing of the file context (data and/or information) with random data, and also a mashing of the context with zeroes, ones, an alternation of ones and zeroes, or a string of specified bytes. Furthermore, the "formula" makes it possible to perform various manipulations aimed at distorting the file meta-data—renaming it, changing the size and various attributes. By combining these methods, it is possible to perform a repeated deletion of the file, realizing all the standard algorithms for irreversible destruction of information. Even so, combining these methods for repeated deletions also has its shortcomings.

One of the shortcomings is that, for automatic file analysis and restoration programs, the shredder to some extent does not complicate, but instead simplifies the analysis problem—it erases the content of the files, and therefore the deleted file cannot be restored, of course, but the space which it occupied is guaranteed not to contain the characteristic signatures allowing the restoration program to identify them as objects of a given type for subsequent analysis and restoration. Therefore, the data restoration program (utility) simply skips over such disk sectors, effectively shortening the work time of the restoration program and reducing the size of protocols and lists of potentially restorable objects displayed for analysis. In a number of instances, after a shredder has been used, there may be a significant reduction in the volumes of such lists, e.g., by orders of magnitude.

A second shortcoming is that the shredder is designed for the irreversible mashing of the content of specified files or folders, but a shredder cannot wipe a free space on a data storage device. But a free space does not mean an empty space, only that it is not occupied by files at the present time. Such a situation is possible when a user for example has deleted files in the usual way, without using a shredder. For example, suppose the user has a flash card in the user's camera. In the course of taking pictures, the user deletes the unsuccessful frames directly on the camera, but the content of the files is not wiped. The user then erases certain photographs with a shredder, having connected the flash card to a computer. Consequently, upon analyzing the flash card, the files wiped in the usual way (on the camera) will be accessible to restoration, including by a hacker.

Hence, there is a need to create a solution which could eliminate these shortcomings and impede and/or prevent restoration of data after a file is deleted.

SUMMARY

Aspects of the disclosure relate to the field of computer security, more specifically to systems and methods for permanent removal of files.

In one exemplary aspect, a method is implemented in a computer comprising a hardware processor, the method comprising: obtaining at least initial data about a file to be deleted in accordance with an instruction to remove the file from a data storage device, analyzing the file to be deleted and the data storage device to determine at least deletion parameters of the file to be deleted, performing a dynamic formation of a deletion algorithm, wherein the formation further includes the formation of a structure for writing and a determination of a location for the writing during the deletion of the file in accordance with the determined deletion parameters and rules of formation, and deleting the file by applying the deletion algorithm.

According to one aspect of the disclosure, a system is provided for permanent removal of files (deletion of files), the system comprising a hardware processor configured to: obtain at least initial data about a file to be deleted in accordance with an instruction to remove the file from a data storage device, analyze the file to be deleted and the data storage device to determine at least deletion parameters of the file to be deleted, perform a dynamic formation of a deletion algorithm, wherein the formation further includes the formation of a structure for writing and a determination of a location for the writing during the deletion of the file in accordance with the determined deletion parameters and rules of formation, and delete the file by applying the deletion algorithm.

In one exemplary aspect, a non-transitory computer-readable medium is provided storing a set of instructions thereon for permanently removing files, wherein the set of instructions comprises instructions for: obtaining at least initial data about a file to be deleted in accordance with an instruction to remove the file from a data storage device, analyzing the file to be deleted and the data storage device to determine at least deletion parameters of the file to be deleted, performing a dynamic formation of a deletion algorithm, wherein the formation further includes the formation of a structure for writing and a determination of a location for the writing during the deletion of the file in accordance with the determined deletion parameters and rules of formation, and deleting the file by applying the deletion algorithm.

In one aspect, the method further comprises deleting information from free space of the data storage device by applying the formulated structure for writing, the free space corresponding to a type of file that needs to be deleted or a type of file that has been deleted.

In one aspect, the deletion of information from the free space, comprises one of: a complete wiping of the entire free space, a partial wiping of the free space at random, and a wiping of only space where information is contained.

In one aspect, the partial wiping of the free space is based on specified percentage of the free space volume to be wiped, a size of a location of the free space being wiped, and an interval.

In one aspect, the wiping of only space where information is contained comprises: determining the information by reading contents of unoccupied clusters and analyzing the content to identify information corresponding to the information that is sought, and when the sought information is discovered, wiping the cluster in which the information is found and a pre-defined number of unoccupied clusters following the cluster in which the information is found.

In one aspect, the analysis of the file is further to determine: a context of the data storage device, the context including information about a type of the data storage device and a file system.

In one aspect, the initial data includes at least a name and a location of the file to be deleted.

In one aspect, the structure indicates at least information that is to be written in place of the file to be deleted.

The permanently removal of files in accordance with the teachings of the present disclosure allows a more reliable solution for file security. The improvement in reliability is achieved: by impeding and in certain instances even making impossible the restoration of data after a file is deleted. In addition, the method wipes (deletes) information which belonged to the deleted files and is contained in the free space of the data storage device—thereby making a compromise between the reliability of a deletion and the resource costs associated with the deletion.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
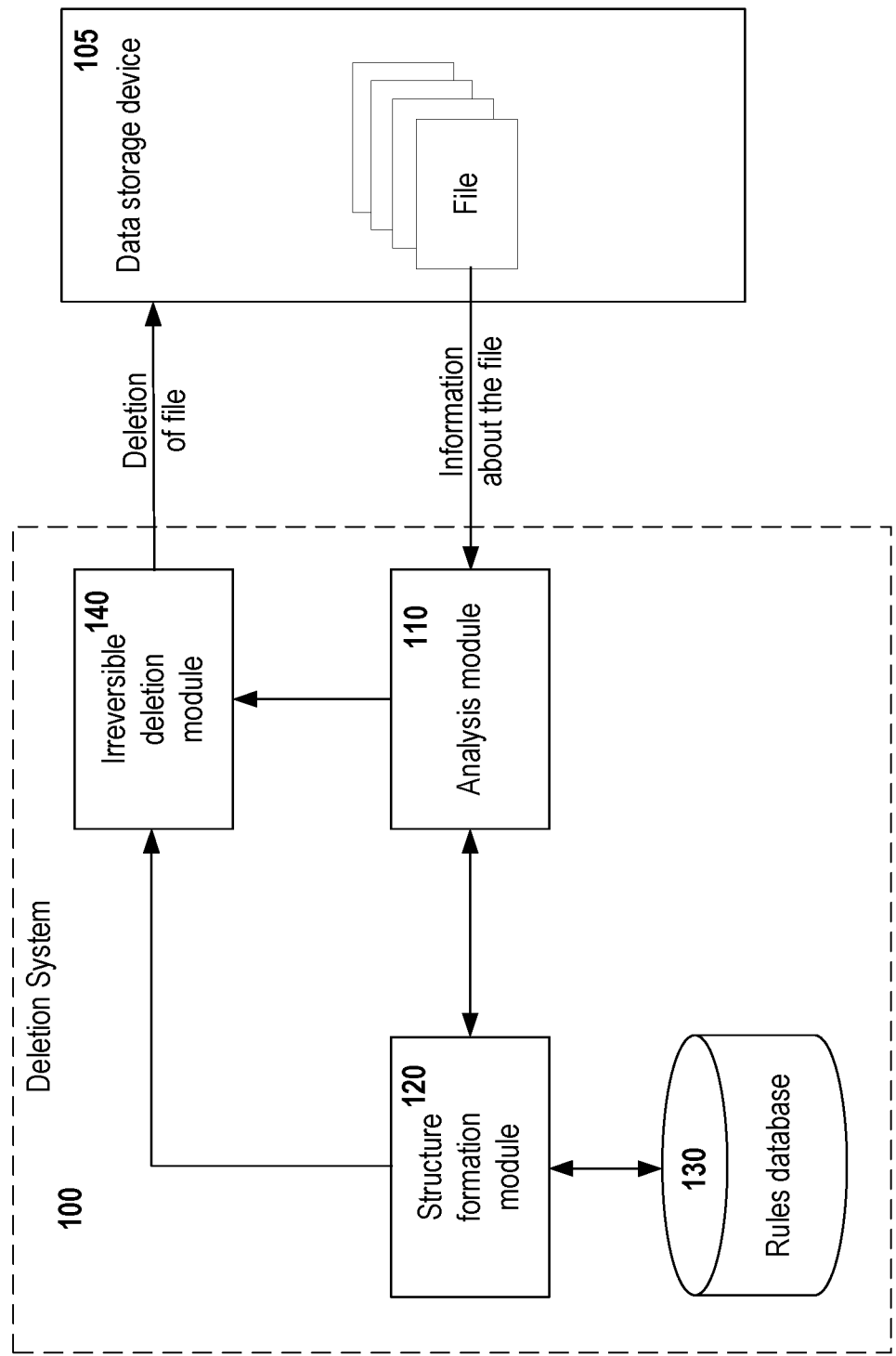
FIG. 1 is a block diagram illustrating an exemplary system for permanently deleting files on a data storage device in accordance with aspects of the present disclosure.

Exemplary aspects are described herein in the context of a system, method, and a computer program for permanent removal of files. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

As an introduction, consider the general operating principle of modern utilities (e.g., programs) for restoring data after deletion of files, consist the following:

obtaining information from a user as to files that need to be searched on a data storage device for restoration, wherein the obtained information may take the form of both a designation of categories (such as "documents", "images", and so forth) and a specific set of file types (such as JPEG, DOCX and so forth);

a scanning of the data storage device for the presence of records labeled with the attribute "deleted file" by a method which involves accessing the file system (for example, file systems such as FAT and NTFS), whereupon files found during the scanning may be displayed along with an evaluation of a likelihood of restoration;

a scanning of space on the data storage device which is considered to be free, wherein during the scan: at the start of each cluster of free space,
(1) a search is done for characteristic signatures that make it possible to determine the file type,
(2) if a signature is found which corresponds to parameters specified in the first step (i.e., corresponds to the obtained information), then the cluster and a string of clusters following the cluster are viewed as potentially restorable objects of the determined type, and
(3) a further analysis of the header is performed to predict the approximate number of clusters for restoration; and a displaying of a list of potentially restorable objects that are found to the user, the displaying including options for selection, preview, and/or restoration.

It should be noted that cluster is understood to include a group of one or more sectors of the data storage device, which are viewed by the operating system as being a single area during disk operations. The size of the cluster depends on the volume of the data storage device and is established during the stage of the formatting of the data storage device.

It should also be noted that, during the scanning of the space, a search is also done for structures similar to the deleted objects of the file system (such as directories) in order to analyze the structure found for the possible use of the information found there for a restoration of the deleted files. Of course, with such a restoration algorithm the analysis process takes a very long time (for example, a flash card of 32 GB may take several hours), and many of the files found will be unneeded, since they will be "garbage" data. However, such an approach can ultimately find and restore all of the deleted files of the user. As noted above, by mashing the content of a file with various unneeded data on the data storage device, the shredder simplifies the work of such restoration utilities, since the restoration utilities do not need to spend time on analysis of the clusters occupied by such a file.

In one aspect, the present disclosure permanently deletes files while preventing restoration of the deleted files. In one aspect, the deletion is performed by overwriting of the file to be deleted with a formulated structure. The structure is formulated either by at least a dynamically random method or with the use of information as to the context of the data storage device and information about the file (files) being deleted. In one aspect, the method of the present disclosure, during the formulating of the structure, takes into account the desire of the user, e.g., the desire being expressed by a degree of irreversibility of the file to be deleted (the degree of importance of the data being deleted). In one aspect, the structure includes information which is written in place of the file to be deleted. In one aspect, the writing may further include writing on the free space of the data storage device. In one aspect, the information of the structure being written includes: headers of files whose type corresponds to the type of the file to be deleted, or as specified on the basis of an analysis of information about the file and the context of the data storage device. In another aspect, the information written is identical to the information indicating the format of the service structures of the file system contained on the data storage device. In particular, the directories, the section headers, the NTFS indexes, the FAT and MFT structures. It should be noted that the structure may either be formed (formulated) in real time or chosen from previously formulated signatures representing variant structures which are stored in a database.

As a rule, the writing of the formulated structure is done during the single or the last file wiping/deletion pass, the writing being done at least in the clusters occupied by the file to be deleted. In certain aspects, the structure may contain several types of headers (signatures) of files for writing in place of the files to be deleted.

In one aspect, during the determining of the structure to be written, the sequence of actions indicating where the formulated structure needs to be written is also determined. The structure may be written either into each cluster occupied by the file to be deleted or with random or specified intervals. Therefore, the choice of the number of signatures in the structure and the location of the signatures on the data storage device is determined during the file deletion by an erase algorithm. The erase algorithm makes it possible to determine the indicated parameters either: randomly on the basis of weighting factors, or by considering such information as the context of the data storage device, the type and size of the file to be deleted.

Another aspect of the method of the present disclosure is the wiping of the free space, i.e., not occupied by files, on the data storage device by filling it with random data in addition to the formulated structure. Such a structure makes it possible to simulate the presence of a group of files of a given type on the data storage device. When both aspects are utilized, i.e., when both the overwriting of clusters of the file to be deleted and the writing of the structure on the free space are used, the content (file contents) of the files being erased will be irreversibly wiped and file restoration utilities will find data pointing to an enormous quantity (such as millions) of wiped and potentially restorable files. As a result, the restoration utilities will not be able to know which of the files that are found are indeed deleted and which are a simulation (i.e., garbage). Therefore, it will be necessary that the restoration utility analyze each identified file. The number of files will increase, e.g., by orders of magnitude—thereby increasing the time and resources of the computer system. The effectiveness of the restoration utilities is lowered, which in turn, makes performing the attempted restoration infeasible.

In yet another aspect of the present disclosure, in order to speed up the process during the deleting of files on a data storage device, the writing of the formulated structures, for example as a simulation of the file headers, may be done not in each cluster of a file to be deleted, but with a spacing of N clusters, where N is chosen depending on the desire of the user. Thus, for example, when N=10, the speed of wiping an unoccupied space rises by a factor of 10, but in this case, the data will be erased every 80 kb. The wiping of the unoccupied space in such a manner guarantees to render files that are practically inaccessible for restoration purposes. For example, the files may contain images, audio/video data, or documents but once deleted, they are practically inaccessible for restoration.

It should be noted that the deletion system of the present disclosure may be implemented either as an independent system or as an improvement to another system, e.g., a system that implements the method described in the Russian Utility Model Patent No. 96433 of AO Kaspersky Laboratory[42], described above.

FIG. 1 is a block diagram illustrating an exemplary system 100 for permanently deleting files on a data storage device in accordance with aspects of the present disclosure. The deletion of files includes counteracting restoration of deleted files. In describing the method of the present disclosure, the data storage device 105 shall be understood to include devices such as a hard disk drive (HDD), a solid state disk (SSD drives), or mobile information media such as a USB flash drive (flash card). Such devices are the main data storage drives in practically all computers.

The deletion system 100 contains, in its layout, an analysis module 110, a structure formation module 120, a rules database 130, and an irreversible deletion module 140. The operations of the deletion system begin when the deletion system 100 receives an instruction for irreversible deletion of at least one file or for a wiping of information from free space that has remained after a previous deletion of a file. The initiator of the deletion may be either the user or software providing a guaranteed deletion of data by a specified algorithm (such as a periodic search for deleted files and their guaranteed deletion). In other words, the user or the software providing the guaranteed deletion invokes the method of the present disclosure to irreversibly delete the at least one file or to wipe information from the free space that remained after a previous deletion. The result of the operations of the deletion system 100 is an irreversible deletion of files or wiping of potentially restorable information.

In one aspect of the present disclosure, the deletion system 100 for irreversible deletion of files, formulates a deletion algorithm dynamically. The deletion algorithm includes a structure for writing and a location for writing. The purpose of the algorithm is deleting a file by overwriting it with the structure. As mentioned above, the location for the writing may be either clusters/sectors of the data storage device containing data of the actual file to be deleted or clusters which have been designated as being empty, i.e., the free space of the data storage device 105.

In one aspect, the method of formulating the deletion algorithm is a deletion algorithm formulated using a formula described in the aforementioned Russian Utility Model Patent No. 96433. Characteristic of the deletion algorithm comprise: a formation of a writing structure and the subsequent deletion with the aid of this structure, and a use for deletion of the free space on the data storage device 105 to counteract the restoration of the deleted files or to totally destroy previously stored information which has been deleted in the usual manner.

Thus, for the deletion of at least one file on the data storage device 105 with counteracting of the restoration of the deleted file, the deletion system 100 uses the analysis module 110 to obtain initial data about the file to be deleted, where the initial data contains at least the name and location of the file to be deleted. In one aspect, the location is understood to include the place of the file in the directory of the file system, i.e., the path (route) for access to the file. The analysis module 110 then determines parameters of the deletion (deletion parameters), which include data about the file to be deleted and the context of the data storage device 105. The context of the data storage device includes at least information about the type of the data storage device and the file system to be used. The analysis module 110 sends the deletion parameters to the structure formation module 120 for fine-tuning (i.e., creation) of the deletion algorithm, the created deletion algorithm including the structure and the place of writing determined in accordance with the received parameters. For the creation (i.e., fine-tuning) of the deletion algorithm, the structure formation module uses formation rules. The formation rules make it possible to determine, on the basis of the obtained deletion parameters, the deletion algorithm with the necessary structure, location, and interval for using the signatures from the writing structure. The signature is the headers of files of a particular type which are intended for writing into the clusters where the file to be deleted is stored, and/or in the free space. At the end of the formation of the deletion algorithm with the writing structure, the irreversible deletion module 140 performs the deletion of the file by applying the formulated algorithm—thereby counteracting restoration of the file possible.

The various operations of each module of the deletion system 100 are described below.

In one aspect of the deletion system 100, the analysis module 110 analyzes the file which needs to be deleted, in order to determine the deletion parameters of the files. For this, the analysis module 110 obtains the initial data about the file to be deleted, wherein the initial data includes at least the name and location of each file to be deleted. Examples of the deletion parameters to be determined are at least one of:

parameters related to the file to be deleted, such as the type and size of the file;

parameters related to the context of the data storage device 105, such as the type of the data storage device 105, the file system to be used, and the types of files contained on the data storage device 105; and parameters related to the needs of the user, such as the speed of deletion of files and the importance of the files to be deleted.

It should be noted that the parameters related to the needs of the user are obtained by the deletion system 100 from the user via a communication module (not shown in FIG. 1), such as input/output devices, or modules for providing options to the user for a selection and obtaining the result of the selection from the user.

Yet another task performed by the analysis module 110 is the analysis of the free space of the data storage device 105 to determine a presence of any information that was previously saved in the form of a file and the information is now considered to be deleted. In order to determine whether or not such information is present, the analysis module 110 performs an analysis of the file system to determine the presence of a free space, the volume and location of the free space when present, and the likely clusters which contain information of a previously deleted file.

After determining the necessary deletion parameters, the analysis module 110 sends the deletion parameters to the structure formation module 120.

The structure formation module 120 is designed for a dynamic formation of the deletion algorithm, including the structure for the file to be deleted, according to the parameters. The deletion algorithm is formed by applying the rules of formation, wherein the structure determines:

the information to be written in place of the file to be deleted;

the place of start of the writing (cluster); and the interval used for further writing according to the writing structure.

The structure formation rules are stored in the rules database 130. The structure to be formed contains information including: how many erase passes will be performed at the location of the file to be deleted, what information will be written in the last erase pass, and with what interval of clusters.

In one aspect, the information to be written is a file header of a given type. The type is assigned on the basis of the parameters that are determined by the analysis module 110, e.g., on the basis of information about the file or files to be deleted that are contained on the data storage device 105. In another aspect, a signature containing the header of a particular type of file is selected randomly on the basis of weighting factors of the types of files. In yet another aspect, the selection of the signature may be combined, for example in cases where several types of file headers will be specified. It should be noted that the information which is written during the deletion of a file will afterwards provide a simulation of the file. For instance, a file header having being written, the data record when analyzed, e.g., by a restoration utility, will point to the presence of a saved file. Accordingly, the file will be selected for further analysis, even though no such file exists.

The weighting factors may be established in dependence on the popularity of the file types and/or given the presence of confidential information or the importance of the information to the user. It should be noted that the interval used to write the signatures (simulating the file headers), in one aspect, is chosen on the basis of the degree of importance of the files to be deleted or the speed of the deletion, making possible a compromise between the reliability of the file deletion and the costs (time, resources) of that deletion. These criteria may be specified by the user or automatically on the basis of previously determined behavior patterns for a given type of file. The behavior patterns may also be stored in the rules database 130 and may be part of the rules of formation. The behavior patterns may be selected, in turn, on the basis of the deletion parameters as determined by the analysis module 110. In general, the behavior patterns are formed experimentally by selecting optimal working aspects. For example, certain behavior patterns will indicate that, in the case of deleting a file which belongs to the Microsoft Office files and is labeled as important by the user, the deleting will be done by an algorithm which provides the greatest guarantee of complete file deletion and with no possibility of restoration. Another behavior pattern will indicate that, during the deletion of a file containing a video, it is necessary to select an algorithm which ensures an optimal deletion in terms of speed and irreversibility of the deletion. A third behavior pattern will indicate that, when deleting a file having a file type ".temp", an algorithm is required which ensures the highest speed of deletion.

In yet another aspect, the writing structure contains, not a signature containing a simulated file header, but a signature containing information simulating the structure of the file system. In this case, in place of the files to be deleted there will be written information similar to the FAT directory, the NTFS indexes, and so forth. Moreover, when forming the directory structure for overwriting the file to be deleted, the structure may contain both writing referring to random clusters of the data storage device 105 and writing referring to actually existing files of the appropriate type. For example, the use of such an approach will be very effective for the file system FAT32 when deleting files from data storage devices (flash cards) contained in cameras and mobile devices.

The structure formation module 120 after forming the deletion algorithm, including the structure, sends the formed deletion algorithm to the irreversible deletion module 140. The irreversible deletion module 140, in turn, after receiving this deletion algorithm, applies the deletion algorithm to delete the files and/or information contained in the free space of the data storage device 105. After the deletion algorithm has been applied by the irreversible deletion module 140, an Nth number of simulations of headers of the given file type will be formed on the data storage device 105 in place of the files to be deleted, and also in the free space, if it is used. These simulations will complicate or impede the restoration of information. The interval N is limited only by the functional capabilities of the devices and modules being used.

Figure 2:
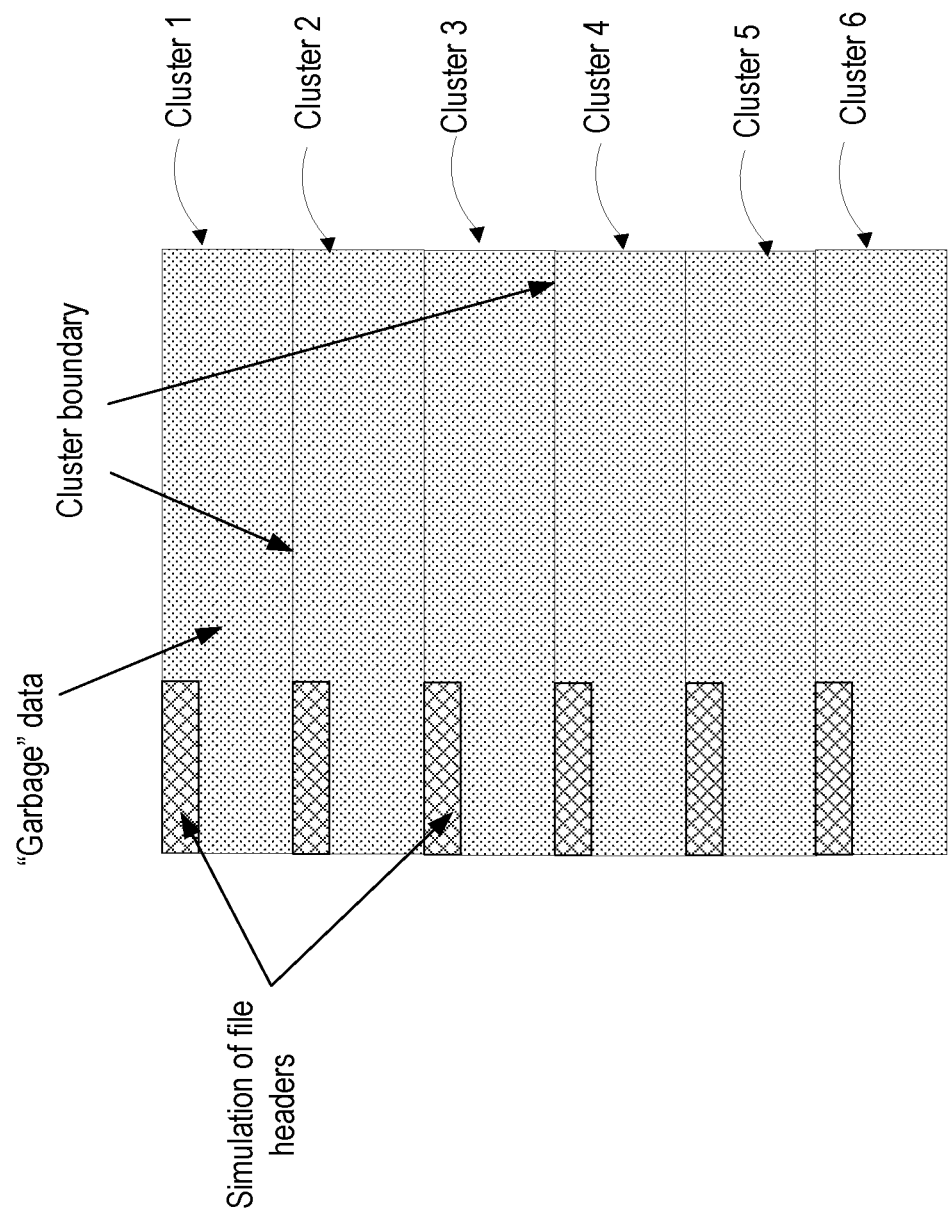
FIG. 2 is an example of the result of the operations of the deletion system of the present disclosure using the system presented in FIG. 1.

FIG. 2 is an example of the result of the operations of the deletion system 100 of the present disclosure using the system presented in FIG. 1. According to FIG. 2, the file to be deleted was previously saved on the data storage device at six clusters. For example, a file of DOC format may be saved at the six clusters. During the deletion, the structure is formulated such that, at the start of each cluster, a prepared header is written, and all other content is erased and written with certain "garbage" data. An example of "garbage" data is a totality of "0", "1" and/or random bytes. Thus, after the deletion of the file, six simulation files are formed. Subsequently, restoration utilities will determine the six simulation files and will require time for their analysis in an attempt to restore the information. It should be noted that the files may not be stored continuously in clusters (as shown in FIG. 2), but in different parts of the data storage device.

In another example of the present disclosure, the user needs to delete one file of JPEG format (a photograph), the size of the file being 4 Mbytes. For an illustrative example, suppose that the file is stored on a flash card. The typical size of one cluster of a flash card is equal to 4 or 8 Kbytes. After selecting the writing structure, a deletion will be done by writing the structure into each cluster where the indicated file is stored. Thus, if a writing structure which is similar to the header of an actual file of the given type is written into each file cluster, there will be created on the flash card 500 or 1000 such headers (depending on the size of the cluster) for only one file with a typical photograph that is deleted. Furthermore, the method described by the present disclosure will not increase the volume of writing on the flash card. Consequently, this method of file deletion/wiping will not increase the overhead costs or change the time of performance of the operation or other parameters in the given file deletion method as compared to standard deletion methods.

Accordingly, the deletion of photographs by the proposed deletion system 100 generates on the flash card between 50 and 100 thousand simulated files to which a restoration utility will respond as it performs a search for files, the search being performed by a sector by sector scanning and analysis of the data storage device. For such a number of objects, the effectiveness of the information restoration utility drops to practically zero. That is, the restoration utility is rendered entirely ineffective for restoration of files deleted in accordance with methods of the present disclosure.

Figure 3:
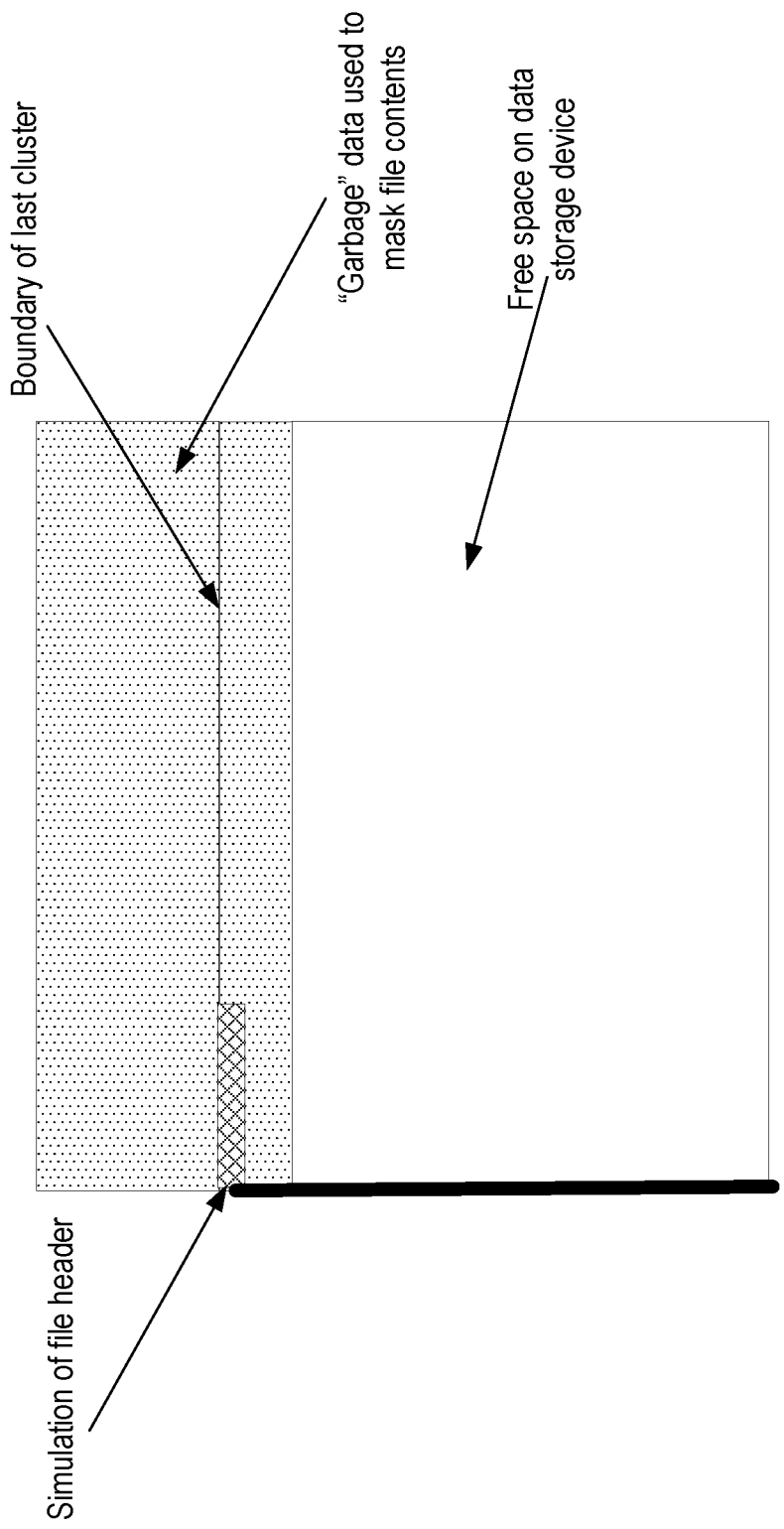
FIG. 3 is an example of the result of the operations of the deletion system when using the free space on the data storage device during file deletion in accordance with the present disclosure.

FIG. 3 is an example of the result of the operations of the deletion system 100 when using the free space on the data storage device 105 during the file deletion in accordance with the present disclosure.

As can be seen from FIG. 3, in the last cluster of a file to be deleted, a certain header has been written. The header will be identified by the restoration utility as the header of a file of a certain popular type. One peculiarity of this example is that a file header has been chosen in which data is present allowing the restoration utility to determine the file size. Having found such a header, the restoration utility may consider the header as a header of a potentially restorable file, and include, in the further analysis, a certain volume of unoccupied space on the data storage device (this fragment is shown in FIG. 3 as a bold stripe). Accordingly, during the further analysis there is a likelihood that the unoccupied space will be assigned, by the restoration utility, to a nonexistent file and be excluded from the analysis. However, this example which also makes use of the free space, unlike the use of a structure for writing into the clusters of a file to be deleted, will not be effective in all instances, but only in a number of instances. It should be noted that said free space, in the first place, may contain information or it may not contain information, and in the second place, the size of the free space may comprise either a single cluster or an Nth number.

In yet another aspect, the deletion system 100 uses the free space of the data storage device 105 separately from the file to be deleted for the writing of the formed structure. In this case, either the entire free space or only a portion of the free space may be used. This makes it possible to: (1) increase the number of simulated files, and (2) at the same time, delete information which might continue to be contained there after the deletion of files, the files having being deleted by the common deletion method (without using a shredder).

Thus, the use of the free space is pertinent, for example, when there is a likelihood during the deletion of a file that files of the same type (as in the example with photographs) were previously deleted. In other words, the user must be protected as much as possible from the files being restored. In this case, the analysis module 110 makes an analysis of the file system and the free space of the data storage device 105 in order to determine parameters such as: the size of the free space, the presence of previously deleted files and their types. The identified parameters are to be used when forming the deletion algorithm and the structure. For example, the larger the unoccupied space, the longer the deletion time, and variants may be selected to speed up the file deletion. Thus, a partial deletion may be used instead of a total wiping of the entire free space of the data storage device 105. In this case, a percentage may be specified for the deletion (wiping of the free space) on the basis of the rules of formation, for example, with a deletion indicator of the order of 10% it becomes impossible to restore certain files. In another aspect, the content of unoccupied clusters is read and analyzed for the presence of data in the unoccupied clusters, the content being similar to a known file. If the analysis indicates a presence of such files, the cluster and a defined number of unoccupied clusters following the cluster are wiped. The wiping makes use of structures simulating the headers of files of a particular type or the structures of directories.

Figure 4:
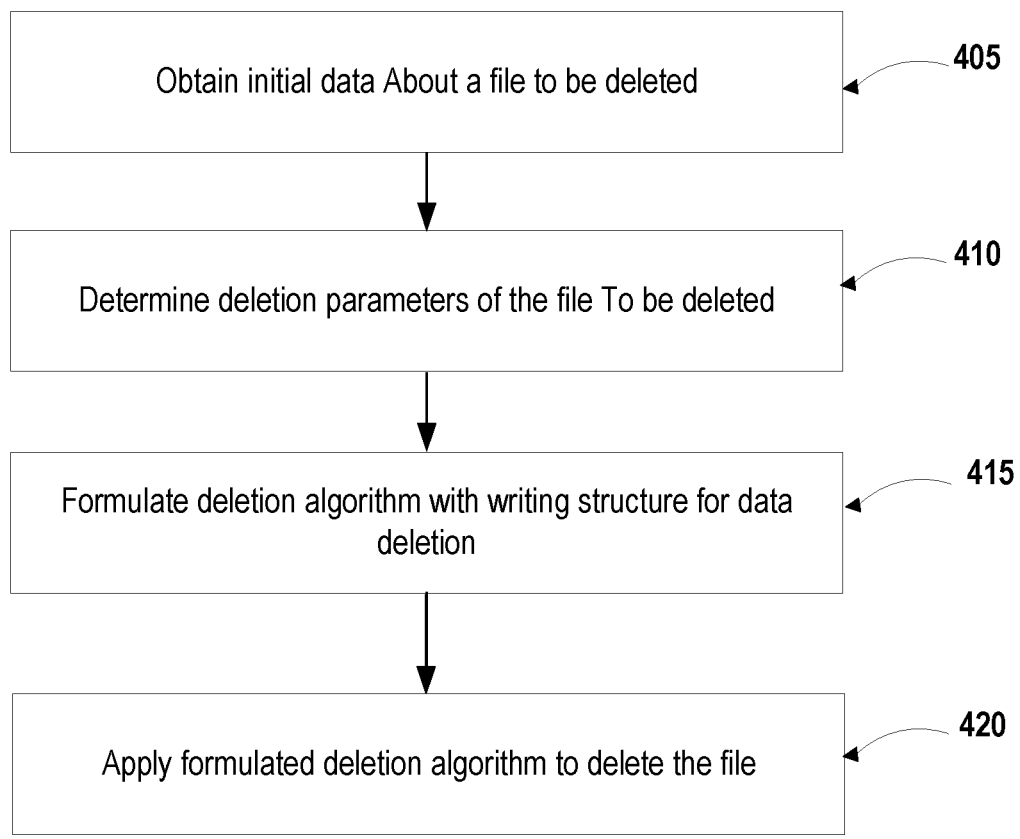
FIG. 4 is a flow diagram illustrating an exemplary method of deleting files in a data storage device, the deletion including counteracting of the restoration of the deleted files.

FIG. 4 is a flow diagram illustrating an exemplary method 400 of deleting files in a data storage device, the deletion including counteracting of the restoration of the deleted files. The deletion system 100 receives an instruction to remove a file from the data storage device 105.

In step 405, the analysis module 110 is used to obtain at least initial data about a file to be deleted in accordance with the instruction to remove the file from a data storage device. In one aspect, the initial data includes at least a name and a location of the file to be deleted.

In step 410, the analysis module 110 analyzes the file to be deleted and the data storage device 105 (for example, the file system) to determine at least deletion parameters of the file to be deleted. In one aspect, during the analysis, the analysis module 110 determines the at least parameters of the file to be deleted (i.e., the file itself), and a context of the data storage device, wherein the context includes information about a type of the data storage device and a file system.

In step 415, the structure formation module 120 is used to perform a dynamic formation (tuning) of a deletion algorithm, wherein the formation further includes the formation of a structure for writing and a determination of a location for the writing during the deletion of the file in accordance with the determined deletion parameters and rules of formation. The rules of formation are obtained from the rules database 130. It should be noted that the structure indicates at least information that is to be written in place of the file to be deleted. In one aspect, the information to be written is a signature of a file header of a given file type. The file type to be inserted into the header may either coincide with the type of the file to be deleted or it may be specified on the basis of the rules of formation or randomly. In the case of specifying several types of signatures by the rules of formation, a selection may be done randomly on the basis of weighting factors. In one aspect, the rules of formation likewise specify the location of writing of the signature, which may be either at the start of each cluster where the file to be deleted was written or a writing interval (spacing) may have been determined. It is also possible to determine the location of the signature directly inside the cluster itself (from start to end).

Yet another aspect in the formation of the structure for writing is that, instead of the signature of a file header of a given type, it is possible to write information similar to the structure of the file system into the file to be deleted.

In step 420, the irreversible deletion module 140 is used to delete the file by applying the formulated deletion algorithm, making it possible to counteract a restoration.

In one aspect, it is possible to delete information from the free space of the data storage device 105 which corresponds to the type of file that needs to be deleted or that has been deleted. The formulated structure is used for the deletion of the information in the free space. For the deletion of information from the free space, the deletion system 100 may use one of the following information deletion aspects:

1. a complete wiping of the entire free space.
2. a partial wiping of the free space at random, specifying a percentage of the free space volume (such as 10%) to be wiped, a size (in clusters) of the location being wiped, and an interval.
3. a wiping of only space where information is contained. For this aspect, the analysis module 110 is used to read the content of unoccupied clusters and analyze the content that is read to identify information corresponding to information that is sought. If the sought information is discovered, the cluster in which the information is found and a pre-defined number of unoccupied clusters following the cluster in which the information is found are wiped.

As described above, the present disclosure describes systems and methods for file deletion, to counteract modern utilities for restoration of deleted files on the basis of a signature search on a data storage device. One advantage of the method of the present disclosure is to counteract the restoration of both the deleted files and the data contained on the data storage device of the deleted files after the deletion of the files by forming a writing structure simulating the presence of a group of files of a given type, followed by writing this at least in the location of the data of the file to be deleted on the data storage device. Such a structure is able to counteract the restoration utilities by complicating their work, such that the restoration of the deleted files becomes not feasible and in the majority of cases not possible.

Another advantage of the present method is to ensure the irreversibility of restoration of information from a previously deleted file by forming a writing structure and then writing it on the data storage device at least in a free space of the data storage device which may contain information of previously deleted files.

Moreover, the method and system of the present disclosure enable a dynamic tuning of a file deletion algorithm, where the algorithm contains the writing structure being formed, on the basis of the deletion parameters, which in turn, are determined on the basis of at least one of: information about the file meta-data, the location of the file, information about the data storage device and its context, and also with the option of including user criteria.

Figure 5:
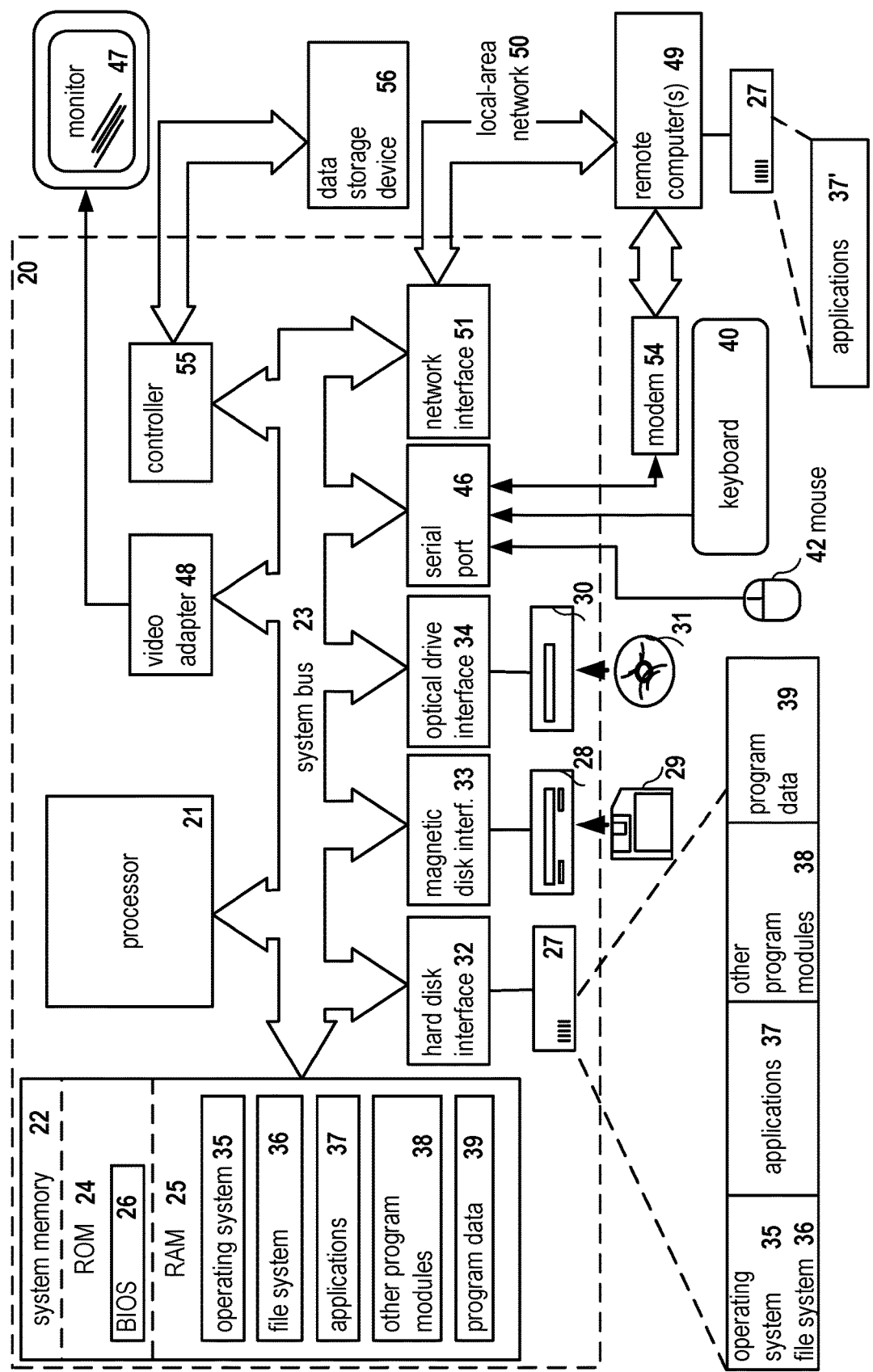
FIG. 5 presents an example of a general-purpose computer system on which aspects of the present disclosure can be implemented.

FIG. 5 is a block diagram illustrating a general-purpose computer system 20 on which aspects of the present disclosure may be implemented in accordance with an exemplary aspect. It should be noted that the computer system 20 can correspond to the system 100, and/or individual components thereof.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between modules of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

In one exemplary aspect, the hard disk 27, the removable magnetic disk 29 and the removable optical disk 31 may be connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned modules in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for deleting files from a data storage device, the method comprising:
    obtaining at least initial data about a file to be deleted in accordance with an instruction to remove the file from the data storage device;
    analyzing the file to be deleted and the data storage device to determine at least deletion parameters of the file to be deleted, wherein the analysis of the data storage device includes at least determining a context of the data storage device, the context including information about a type of the data storage device and a file system of the data storage device;
    performing a dynamic formation of a deletion algorithm, wherein the formation further includes the formation of a structure for writing and a determination of a location for the writing during the deletion of the file in accordance with rules of formation and the determined deletion parameters, wherein the structure for writing includes at least one of:
    signatures of files headers of predetermined files types and information indicating format of service structures of the file system of the data storage device;
    deleting the file from the data storage device by applying the deletion algorithm; and
    deleting information from free space of the data storage device by applying the structure for writing, the free space corresponding to a type of file that needs to be deleted or a type of file that has been deleted.

2. The method of claim 1, the deletion of information from the free space, comprising one of:
    a complete wiping of the entire free space;
    a partial wiping of the free space at random; and
    a wiping of only space where information is contained.

3. The method of claim 2, wherein
    the partial wiping of the free space is based on specified percentage of the free space volume to be wiped, a size of a location of the free space being wiped, and an interval; and
    the wiping of only space where information is contained comprises: determining the information by reading contents of unoccupied clusters and analyzing the content to identify information corresponding to information that is sought, and when the sought information is discovered, wiping a cluster in which the information is found and a pre-defined number of unoccupied clusters following the cluster in which the information is found.

4. The method of claim 1, wherein the analysis of the file is further to determine: a context of the data storage device, the context including information about a type of the data storage device and a file system.

5. The method of claim 1, wherein the initial data includes at least a name and a location of the file to be deleted.

6. The method of claim 1, wherein the structure indicates at least information that is to be written in place of the file to be deleted.

7. A system for deleting files from a data storage device, comprising:
    at least one processor configured to:
    obtain at least initial data about a file to be deleted in accordance with an instruction to remove the file from the data storage device;
    analyze the file to be deleted and the data storage device to determine at least deletion parameters of the file to be deleted, wherein the analysis of the data storage device includes at least determining a context of the data storage device, the context including information about a type of the data storage device and a file system of the data storage device;
    perform a dynamic formation of a deletion algorithm, wherein the formation further includes the formation of a structure for writing and a determination of a location for the writing during the deletion of the file in accordance with rules of formation and the determined deletion parameters, wherein the structure for writing includes at least one of: signatures of files headers of predetermined files types and information indicating format of service structures of the file system of the data storage device;
    delete the file from the data storage device by applying the deletion algorithm; and
    delete information from free space of the data storage device by applying the structure for writing, the free space corresponding to a type of file that needs to be deleted or a type of file that has been deleted.

8. The system of claim 7, the deletion of information from the free space, comprising one of:
    a complete wiping of the entire free space;
    a partial wiping of the free space at random; and
    a wiping of only space where information is contained.

9. The system of claim 8, wherein
    the partial wiping of the free space is based on specified percentage of the free space volume to be wiped, a size of a location of the free space being wiped, and an interval; and
    the wiping of only space where information is contained comprises: determining the information by reading contents of unoccupied clusters and analyzing the content to identify information corresponding to information that is sought, and when the sought information is discovered, wiping a cluster in which the information is found and a pre-defined number of unoccupied clusters following the cluster in which the information is found.

10. The system of claim 7, wherein the analysis of the file is further to determine: a context of the data storage device, the context including information about a type of the data storage device and a file system.

11. The system of claim 7, wherein the initial data includes at least a name and a location of the file to be deleted.

12. The system of claim 7, wherein the structure indicates at least information that is to be written in place of the file to be deleted.

13. A non-transitory computer readable medium storing thereon computer executable instructions for deleting files from a data storage device, including instructions for:
   obtaining at least initial data about a file to be deleted in accordance with an instruction to remove the file from the data storage device;
   analyzing the file to be deleted and the data storage device to determine at least deletion parameters of the file to be deleted, wherein the analysis of the data storage device includes at least determining a context of the data storage device, the context including information about a type of the data storage device and a file system of the data storage device;
   performing a dynamic formation of a deletion algorithm, wherein the formation further includes the formation of a structure for writing and a determination of a location for the writing during the deletion of the file in accordance with rules of formation and the determined deletion parameters, wherein the structure for writing includes at least one of: signatures of files headers of predetermined files types and information indicating format of service structures of the file system of the data storage device;
   deleting the file from the data storage device by applying the deletion algorithm; and
   deleting information from free space of the data storage device by applying the structure for writing, the free space corresponding to a type of file that needs to be deleted or a type of file that has been deleted.

14. The non-transitory computer readable medium of claim 13, the deletion of information from the free space, comprising one of:
   a complete wiping of the entire free space;
   a partial wiping of the free space at random; and
   a wiping of only space where information is contained.

15. The non-transitory computer readable medium of claim 14, wherein
   the partial wiping of the free space is based on specified percentage of the free space volume to be wiped, a size of a location of the free space being wiped, and an interval; and
   the wiping of only space where information is contained comprises: determining the information by reading contents of unoccupied clusters and analyzing the content to identify information corresponding to information that is sought, and when the sought information is discovered, wiping a cluster in which the information is found and a pre-defined number of unoccupied clusters following the cluster in which the information is found.

16. The non-transitory computer readable medium of claim 13, wherein the analysis of the file is further to determine: a context of the data storage device, the context including information about a type of the data storage device and a file system.

17. The non-transitory computer readable medium of claim 13, wherein the initial data includes at least a name and a location of the file to be deleted.

* * * * *